(12) United States Patent
MacBain et al.

(10) Patent No.: US 10,260,783 B2
(45) Date of Patent: Apr. 16, 2019

(54) CHILLER COMPRESSOR OIL CONDITIONING

(71) Applicant: Carrier Corporation, Farmington, CT (US)

(72) Inventors: Scott M. MacBain, Syracuse, NY (US); David M. Rockwell, Cicero, NY (US); Ulf J. Jonsson, South Windsor, CT (US)

(73) Assignee: CARRIER CORPORATION, Farmington, CT (US)

( * ) Notice: Subject to any disclaimer, the term of this patent is extended or adjusted under 35 U.S.C. 154(b) by 0 days.

(21) Appl. No.: 15/508,420

(22) PCT Filed: Sep. 9, 2015

(86) PCT No.: PCT/US2015/049063
§ 371 (c)(1),
(2) Date: Mar. 2, 2017

(87) PCT Pub. No.: WO2016/040408
PCT Pub. Date: Mar. 17, 2016

(65) Prior Publication Data
US 2017/0248352 A1    Aug. 31, 2017

Related U.S. Application Data

(60) Provisional application No. 62/047,681, filed on Sep. 9, 2014.

(51) Int. Cl.
*F25B 31/00* (2006.01)
*F25B 43/02* (2006.01)
(Continued)

(52) U.S. Cl.
CPC .......... *F25B 31/006* (2013.01); *F25B 31/004* (2013.01); *F25B 43/02* (2013.01);
(Continued)

(58) Field of Classification Search
CPC ..... F25B 31/002; F25B 31/006; F25B 31/004
See application file for complete search history.

(56) References Cited

U.S. PATENT DOCUMENTS 3,859,815 A * 1/1975 Kasahara .................. F25B 1/10
417/371
4,254,637 A * 3/1981 Brauch .................... F25B 43/02
62/468
(Continued)

FOREIGN PATENT DOCUMENTS

CN    202954876 U    5/2013
WO    2012158653 A2    11/2012

OTHER PUBLICATIONS

Daikin, "Variable Frequency Drives Air-Cooled, LiquiFlo⊥ and LiquiFlo 2:0", available at: http://lit.daikinapplied.com/bizlit/DocumentStorage/WaterCooledChiller/InstallationandOperationManuals/IOMM_1159__062112.pdf, Jun. 2012, 100pgs.
(Continued)

*Primary Examiner* — Cassey D Bauer
(74) *Attorney, Agent, or Firm* — Cantor Colburn LLP

(57) ABSTRACT

In one aspect, a refrigeration system is provided. The refrigeration system includes a compressor coupled to a variable frequency drive (VFD), a condenser, an evaporator, an oil separator, and an oil conditioning circuit. The oil conditioning circuit is thermally coupled to the VFD and configured to heat oil from the oil separator with heat produced by the VFD.

11 Claims, 2 Drawing Sheets

(51) Int. Cl.
*F25B 49/02* (2006.01)
*F25B 1/10* (2006.01)

(52) U.S. Cl.
CPC ............ *F25B 49/02* (2013.01); *F25B 49/025* (2013.01); *F25B 1/10* (2013.01); *F25B 31/00* (2013.01); *F25B 2339/02* (2013.01); *F25B 2400/01* (2013.01); *F25B 2500/16* (2013.01); *F25B 2600/0253* (2013.01); *Y02B 30/741* (2013.01)

(56) References Cited

U.S. PATENT DOCUMENTS

| | | | |
|---|---|---|---|
| 4,377,938 A * | 3/1983 | Crespin | F01M 5/00 165/104.28 |
| 5,570,583 A * | 11/1996 | Boehde | F25B 1/047 62/470 |
| 6,116,040 A | 9/2000 | Stark | |
| 6,237,353 B1 | 5/2001 | Sishtla et al. | |
| 6,434,960 B1 | 8/2002 | Rousseau | |
| 6,688,124 B1 | 2/2004 | Stark et al. | |
| 6,722,156 B2 | 4/2004 | Tanimoto et al. | |
| 6,874,329 B2 | 4/2005 | Stark et al. | |
| 7,442,239 B2 | 10/2008 | Armstrong et al. | |
| 7,836,713 B2 | 11/2010 | Lifson et al. | |
| 8,096,139 B2 | 1/2012 | Taras et al. | |
| 8,156,757 B2 | 4/2012 | Doty et al. | |
| 8,734,125 B2 | 5/2014 | McSweeney et al. | |
| 2003/0192338 A1 | 10/2003 | Manohar | |
| 2007/0186581 A1 | 8/2007 | Mistry et al. | |
| 2010/0251756 A1 * | 10/2010 | Scarcella | F25B 31/002 62/457.9 |
| 2013/0247607 A1 | 9/2013 | Love et al. | |
| 2013/0255292 A1 | 10/2013 | Voorhis | |

OTHER PUBLICATIONS

International Search Report and Written Opinion for application PCT/US2015/049063, dated Nov. 19, 2015, 10 pages.

* cited by examiner

CHILLER COMPRESSOR OIL CONDITIONING

FIELD OF THE INVENTION

The subject matter disclosed herein relates to refrigeration systems and, more specifically, to refrigeration system compressors with variable frequency drives.

BACKGROUND

Compressors used in many refrigeration systems generally require close control over the compressor motor speed in order to maintain the system within desired limits under varying load conditions. Such refrigeration systems may include compressors where motor speed is varied via incorporation with variable frequency drives (VFD) that contain power electronic components that produce heat and require cooling.

With VFD compressors utilizing rolling element bearings, the oil viscosity required to ensure reliable operation is a function of the rotating speed. Some compressors operate at low speeds and may require oil with a high viscosity. To achieve high viscosity with typical refrigerant and oil mixtures, obtaining an optimal temperature for the given pressure of the mixture is needed. This has typically been achieved with oil cooling or supplemental electric heat. Accordingly, it is desirable to achieve a required oil viscosity without the need for supplemental electric heat or excessive parasitic losses from oil cooling to achieve more efficient operation.

BRIEF DESCRIPTION OF THE INVENTION

In one aspect, a refrigeration system is provided. The refrigeration system includes a compressor coupled to a variable frequency drive (VFD), a condenser, an evaporator, an oil separator, and an oil conditioning circuit. The oil conditioning circuit is thermally coupled to the VFD and configured to heat oil from the oil separator with heat produced by the VFD.

In another aspect, a method of conditioning oil in a refrigeration system having a compressor coupled to a variable frequency device (VFD), a condenser, an evaporator, an oil separator, and an oil conditioning circuit is provided. The method includes providing oil to the oil separator from the compressor, thermally coupling the oil conditioning circuit and the VFD, supplying the oil to the oil conditioning circuit, and heating the oil in the oil conditioning circuit with heat produced by the VFD.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
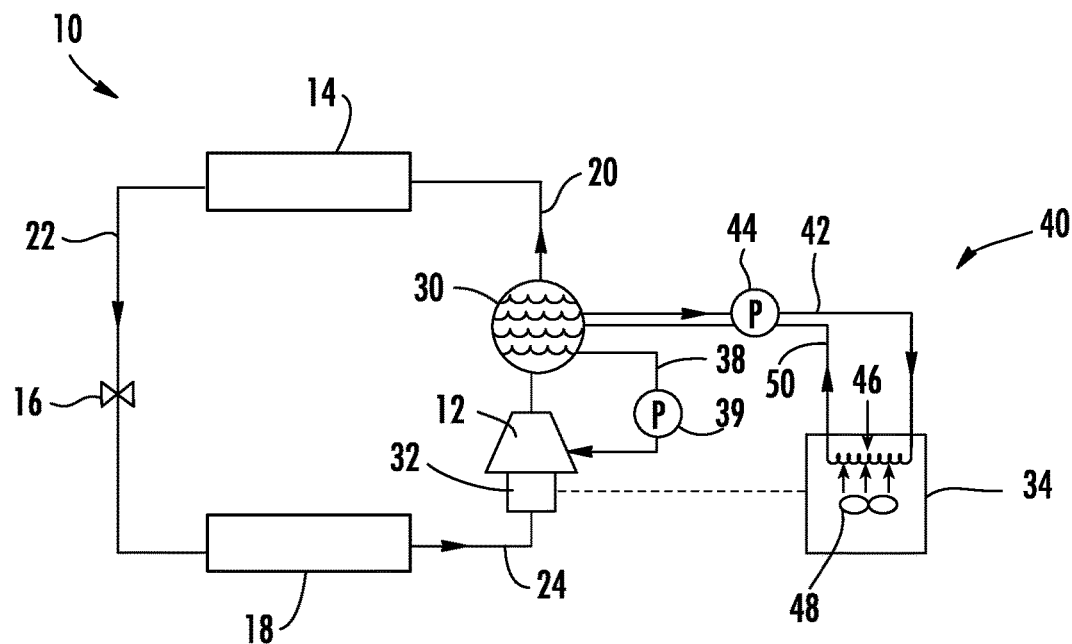
FIG. 1 is a schematic illustration of an exemplary refrigeration system.

FIG. 1 illustrates an exemplary refrigeration system 10 that generally includes a compressor 12, a condenser 14, an expansion device 16, and an evaporator 18. Condenser 14 is arranged to receive high pressure refrigerant in a vapor state from compressor 12 via a discharge line 20. The refrigerant is condensed in condenser 14 and is supplied to evaporator 18 via a conduit line 22. Typically, the refrigerant in condenser 14 is cooled using cooling water, air, or the like, which carries away the heat of condensation. Expansion device 16 (e.g., expansion valve) is mounted within conduit line 22 and serves to throttle the liquid refrigerant down to a lower pressure and to regulate the flow of refrigerant through the system. Due to the expansion process, the temperature and pressure of the refrigerant is reduced prior to entering evaporator 18.

In evaporator 18, the refrigerant is brought into heat transfer relationship with a substance to be chilled such as water. The refrigerant at the lower pressure absorbs heat from the substance being cooled and the refrigerant is subsequently vaporized. Saturated vapors are then drawn from evaporator 18 via compressor inlet line 24 and compressed to begin the cycle over again.

In the exemplary embodiment, refrigeration system 10 further includes an oil separator 30 disposed on line 20, a motor 32, and a variable frequency drive (VFD) 34. Oil separator 30 removes oil from the vapor refrigerant and returns the separated oil to compressor 12 via an oil return line 38, which may optionally include a pump 39. Motor 32 drives compressor 12, and VFD 34 controls the speed of motor 32. VFD 34 contains power electronics that may require cooling in order for the drive to operate under optimum conditions over the operating range of the system.

As shown in FIG. 1, refrigeration system 10 includes an oil conditioning circuit 40 that generally includes a supply conduit 42, an oil pump 44, a heat exchanger 46, a fan 48, and a return conduit 50. Conditioning circuit 40 is configured to condition the oil to achieve a desired temperature and viscosity for compressor 12. For example, high viscosity oil is desirable for compressors that include rolling element bearings.

In operation, oil is separated from compressed refrigerant within oil separator 30. Pump 44 supplies the separated oil through supply conduit 42 to heat exchanger 46, where the oil is heated by waste heat produced by VFD 34. Heating of the oil dissipates the heat generated within VFD 34. In one embodiment, VFD 34 is cooled by an optional fan 48 blowing air heated by VFD 34 across heat exchanger 46, or via heat transfer between the oil and a chill plate (not shown) in contact with the power electronics components. The heated oil is then returned to oil separator 30 via return conduit 50 and subsequently supplied to compressor 12 via oil return line 38.

As such, oil conditioning circuit 40 utilizes waste heat produced by VFD 34 as a heat source for oil conditioning. This reduces or eliminates the need for additional VFD heat dissipation techniques such as use of external fans and pumps, refrigerant from the chiller, or water from the chiller. Eliminating or reducing the use of refrigerant or water from the chiller subsequently increases efficiency of refrigeration system 10.

Figure 2:
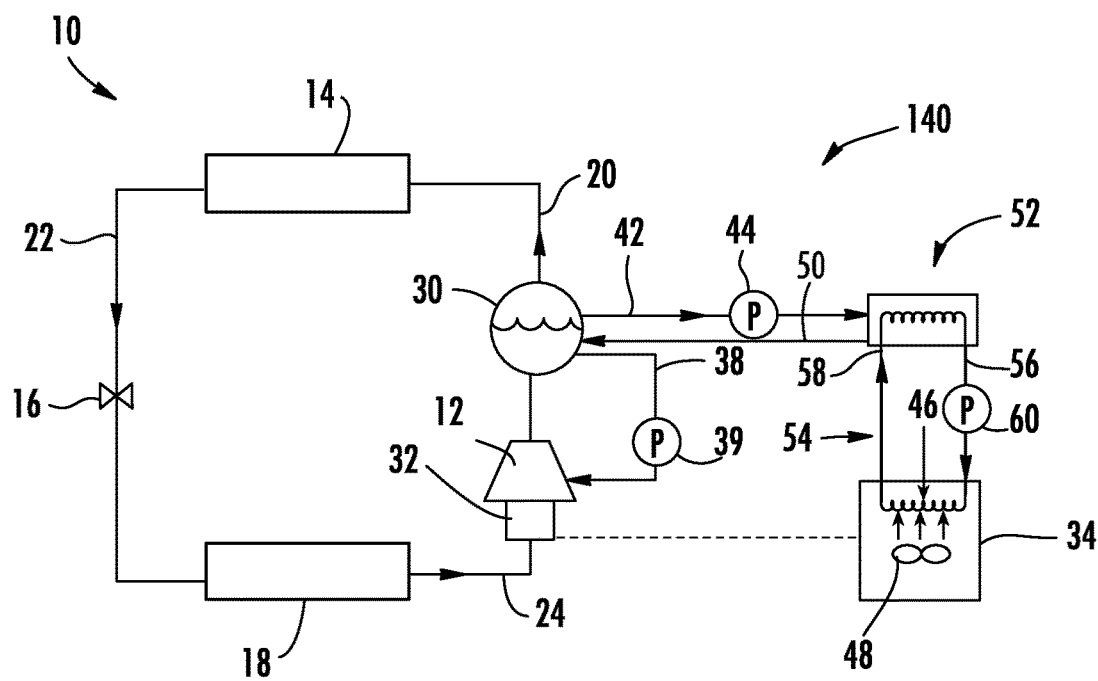
FIG. 2 is a schematic illustration of another exemplary refrigeration system.

FIG. 2 illustrates an alternative embodiment of refrigeration system 10 that comprises an oil conditioning circuit 140, which includes supply conduit 42, oil pump 44, heat exchanger 46, fan 48, and return conduit 50. However, in the exemplary embodiment, circuit 140 includes an intermediate heat exchanger 52 and an intermediate coolant circuit 54, which includes a supply conduit 56, a return conduit 58, and a pump 60 to circulate an intermediate coolant through circuit 54.

In operation, oil is separated from compressed refrigerant within oil separator 30. Pump 44 supplies the separated oil to intermediate heat exchanger 52 where the oil is heated by coolant flowing within intermediate coolant circuit 54, which cools the intermediate coolant. Pump 58 supplies the cooled intermediate coolant through conduit 56 to heat exchanger 46, where the coolant within heat exchanger 46 is heated by waste heat produced by VFD 34. The heated intermediate coolant is then returned to intermediate heat exchanger 52 where it is again cooled by the oil.

Figure 3:
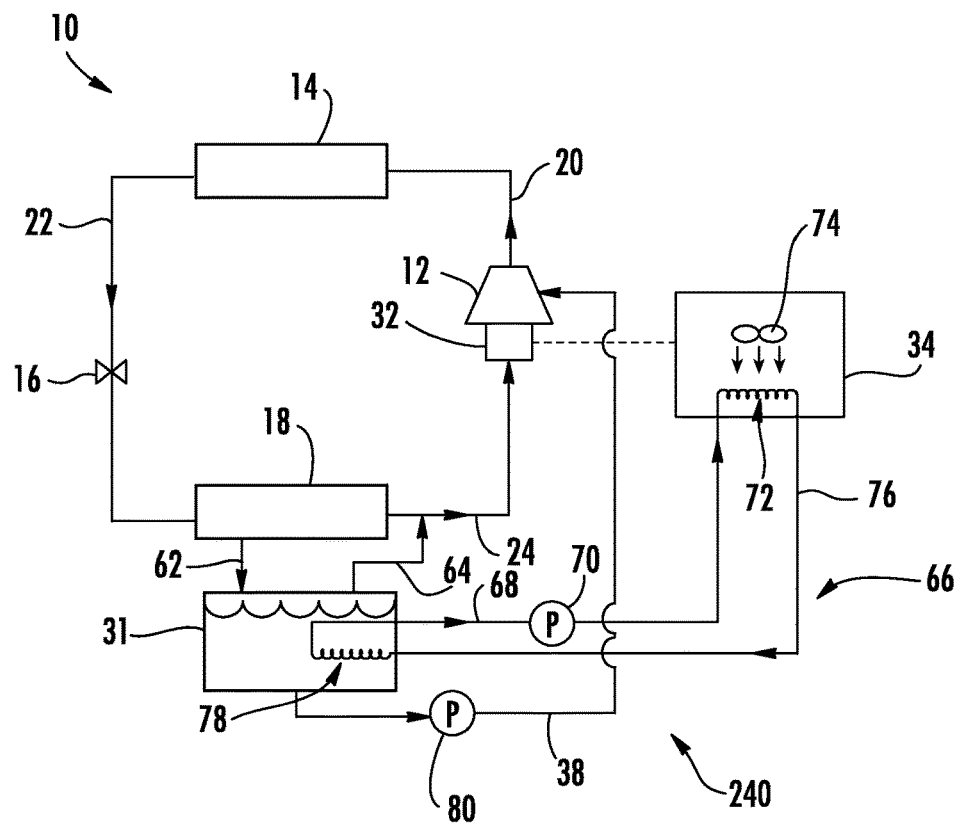
FIG. 3 is a schematic illustration of yet another exemplary refrigeration system.

FIG. 3 illustrates an alternative embodiment of refrigeration system 10 that comprises an oil separator 31 and an oil conditioning circuit 240. Oil separator 31 is fluidly coupled to evaporator 18 and inlet line 24 by an inlet conduit 62 and an outlet conduit 64, respectively. Oil conditioning circuit 240 includes an intermediate coolant circuit 66, which includes a supply conduit 68, a pump 70, a heat exchanger 72, an optional fan 74, a return conduit 76, and an intermediate heat exchanger 78.

In operation, oil separator 31 receives an oil/refrigerant mixture from evaporator 18 via inlet conduit 62. Oil is contained within separator 31 and any refrigerant vapor generated may return to compressor inlet line 24 via outlet conduit 64. The oil is heated by an intermediate coolant (e.g., oil or glycol) flowing through heat exchanger 78. A pump 80 subsequently supplies the heated oil to compressor 12 via oil return line 38. The intermediate coolant within heat exchanger 78 is supplied by pump 70 to heat exchanger 72 through conduit 68 where the coolant is heated by waste heat produced by VFD 34. The heated intermediate coolant is returned to intermediate heat exchanger 78 through return conduit 76 where it is again cooled by the oil.

Figure 4:
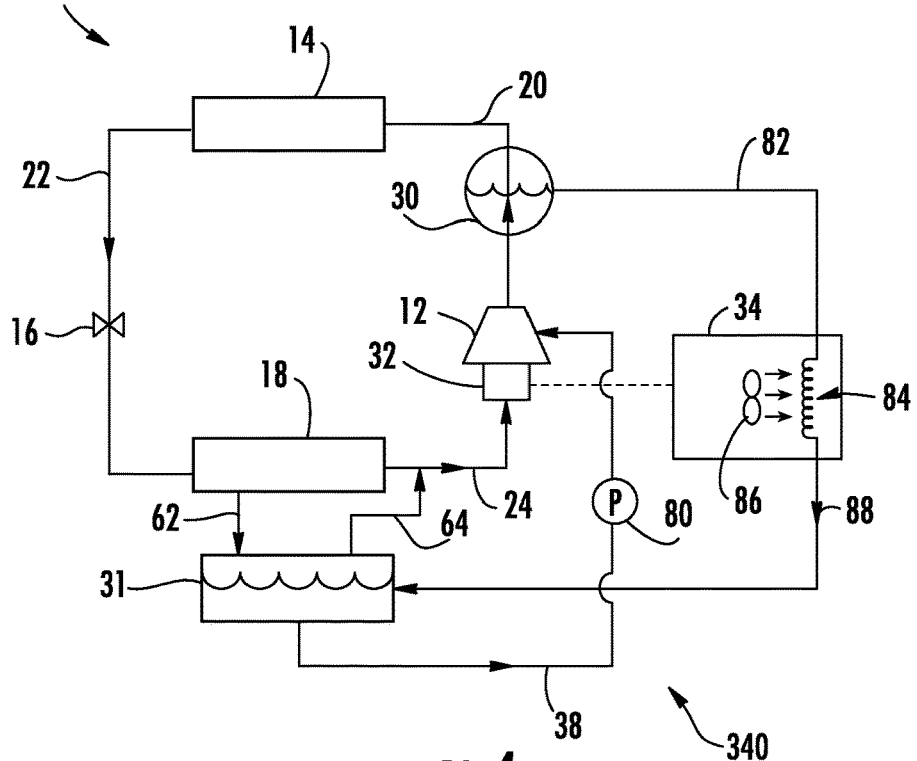
FIG. 4 is a schematic illustration of yet another exemplary refrigeration system.

FIG. 4 illustrates an alternative embodiment of refrigeration system 10 that comprises oil separators 30, 31 and an oil conditioning circuit 340. Oil separator 31 is fluidly coupled to evaporator 18 and inlet line 24 by an inlet conduit 62 and an outlet conduit 64, respectively. Oil conditioning circuit 340 includes a conduit 82, a heat exchanger 84, an optional fan 86, and a conduit 88.

In operation, oil separator 31 receives an oil/refrigerant mixture from evaporator 18 via inlet conduit 62. Oil is contained within separator 31 and refrigerant vapor generated may return to compressor inlet line 24 via outlet conduit 64. Oil is also separated from compressed refrigerant within oil separator 30. Separated oil is supplied through conduit 82 to heat exchanger 84 where the oil is heated by waste heat produced by VFD 34. For example, fan 86 may blow air heated by VFD 34 across heat exchanger 84, or via heat transfer between the oil and a chill plate (not shown) mounted to the power electronics components. The heated oil is returned to oil separator 31 via conduit 88 and is subsequently supplied to compressor 12 via oil return line 38 with pump 80.

The systems and methods described herein provide a refrigeration system utilizing VFD waste heat for oil conditioning (e.g., heating). Oil is supplied through an oil conditioning circuit and is heated by indirect heat exchange with heated air or a chill plate in thermal contact with the VFD components. The conditioning of the oil to a desired temperature increases its viscosity and improves compressor reliability. Thus, electric heaters used to heat oil may eliminated from the system. Further, cooling of the VFD using external fans or pumps, refrigerant from the chiller, or water from the chiller may be reduced or eliminated. Accordingly, utilization of the VFD waste heat to condition the oil increases system efficiency.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A refrigeration system comprising:
a compressor coupled to a variable frequency drive (VFD);
a condenser;
an evaporator;
an oil separator; and
an oil conditioning circuit thermally coupled to the VFD and configured to heat oil from the oil separator with heat produced by the VFD;
wherein the oil conditioning circuit comprises a heat exchanger and a conduit extending between the oil separator and the heat exchanger, the conduit configured to supply oil from the oil separator to the heat exchanger for heat exchange with the VFD;
wherein the heat exchanger is disposed within the VFD, the VFD including at least one of a fan to blow air heated by the VFD across the heat exchanger and a chill plate thermally coupled to components of the VFD.

2. A refrigeration system comprising:
a compressor coupled to a variable frequency drive (VFD);
a condenser;
an evaporator;
an oil separator; and
an oil conditioning circuit thermally coupled to the VFD and configured to heat oil from the oil separator with heat produced by the VFD;
wherein the oil conditioning circuit comprises a heat exchanger and a conduit extending between the oil separator and the heat exchanger, the conduit configured to supply oil from the oil separator to the heat exchanger for heat exchange with the VFD;
a pump connected to the conduit, the pump configured to pump oil from the oil separator to the heat exchanger.

3. The system of claim 2, further comprising an intermediate coolant circuit having an intermediate coolant and configured to provide indirect heat exchange between the oil and the VFD via the intermediate coolant.

4. The system of claim 3, wherein the intermediate coolant circuit comprises a coolant line extending between the heat exchanger and a VFD heat exchanger, the coolant line configured to supply the intermediate coolant from the heat exchanger where it is cooled by the oil to the VFD heat exchanger where it is heated by the VFD.

5. The system of claim 4, further comprising a pump connected to the coolant line, the pump configured to pump the intermediate coolant from the heat exchanger to the VFD heat exchanger.

6. A refrigeration system comprising:
a compressor coupled to a variable frequency drive (VFD);
a condenser;
an evaporator;
an oil separator; and
an oil conditioning circuit thermally coupled to the VFD and configured to heat oil from the oil separator with heat produced by the VFD;
wherein the oil conditioning circuit comprises a first heat exchanger disposed within the oil separator, a second heat exchanger, and a conduit extending between the first heat exchanger and the second heat exchanger, the conduit configured to supply an intermediate coolant from the first heat exchanger where it is cooled by the oil to the second heat exchanger where it is heated by the VFD.

7. The system of claim 6, further comprising a pump connected to the conduit, the pump configured to pump the intermediate coolant from the first heat exchanger to the second heat exchanger.

8. The system of claim 7, wherein the intermediate coolant is a second oil.

9. A refrigeration system comprising:
a compressor coupled to a variable frequency drive (VFD);
a condenser;
an evaporator;
an oil separator; and
an oil conditioning circuit thermally coupled to the VFD and configured to heat oil from the oil separator with heat produced by the VFD;
wherein the oil conditioning circuit comprises a heat exchanger and a conduit extending between the oil separator and the heat exchanger, the conduit configured to supply oil from the oil separator to the heat exchanger for heat exchange with the VFD;
a second oil separator and a second conduit extending between the heat exchanger and the second oil separator, the second conduit configured to supply the heated oil from the heat exchanger to the second oil separator.

10. The system of claim 9, wherein the second oil separator is fluidly coupled to the evaporator.

11. The system of claim 1, wherein the oil separator comprises a first outlet directing refrigerant to the condenser and a second outlet, wherein oil from the second outlet is provided to the oil conditioning circuit.

* * * * *